United States Patent
Dubreuil et al.

(10) Patent No.: US 10,436,060 B2
(45) Date of Patent: Oct. 8, 2019

(54) SHAFT EVENT DETECTION IN GAS TURBINE ENGINES

(71) Applicant: PRATT & WHITNEY CANADA CORP., Longueuil (CA)

(72) Inventors: Jean Dubreuil, Boucherville (CA); Johnny Vinski, Chateauguay (CA); Michel Desjardins, St-Hubert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 325 days.

(21) Appl. No.: 15/374,115

(22) Filed: Dec. 9, 2016

(65) Prior Publication Data
US 2018/0163640 A1 Jun. 14, 2018

(51) Int. Cl.
F01D 21/04 (2006.01)
F01D 21/00 (2006.01)
F02C 3/10 (2006.01)

(52) U.S. Cl.
CPC ......... F01D 21/003 (2013.01); F01D 21/045 (2013.01); F02C 3/10 (2013.01); F05D 2260/80 (2013.01); F05D 2270/304 (2013.01); F05D 2270/80 (2013.01)

(58) Field of Classification Search
CPC ........ F01D 17/06; F01D 21/02; F01D 21/003; F01D 21/04; F01D 21/045; F05D 2270/021; F05D 2270/304; F05D 2270/091
See application file for complete search history.

(56) References Cited

U.S. PATENT DOCUMENTS

| | | | |
|---|---|---|---|
| 4,651,563 A | 3/1987 | Zweifel | |
| 6,494,046 B1 * | 12/2002 | Hayess | F01D 21/00 60/39.091 |
| 8,172,509 B2 * | 5/2012 | Bart | F01D 21/003 415/118 |
| 8,943,876 B2 * | 2/2015 | Rowe | F01D 21/003 73/112.01 |
| 2016/0003093 A1 * | 1/2016 | McCune | F02C 7/06 415/1 |
| 2016/0123180 A1 | 5/2016 | Otto | |
| 2016/0273379 A1 * | 9/2016 | Soares, Jr. | G05B 23/0254 |
| 2016/0298486 A1 * | 10/2016 | Langford | F01D 21/02 |
| 2016/0363001 A1 * | 12/2016 | Argote | F01D 21/04 |
| 2017/0191374 A1 * | 7/2017 | Boettner | F01D 21/02 |

* cited by examiner

Primary Examiner — Patrick Hamo
(74) Attorney, Agent, or Firm — Norton Rose Fulbright Canada LLP

(57) ABSTRACT

There is described herein methods and systems for detecting a shaft event in a gas turbine engine comprising a power turbine having a first shaft extending in a first direction and a second shaft extending in a second direction opposite from the first direction. A first speed measurement is obtained at a first location along the first shaft and a second speed measurement is obtained at a second location along the second shaft. A speed ratio is determined between the first speed measurement and the second speed measurement, and is compared to a detection threshold. The shaft event is detected when the speed ratio is beyond the detection threshold.

20 Claims, 4 Drawing Sheets

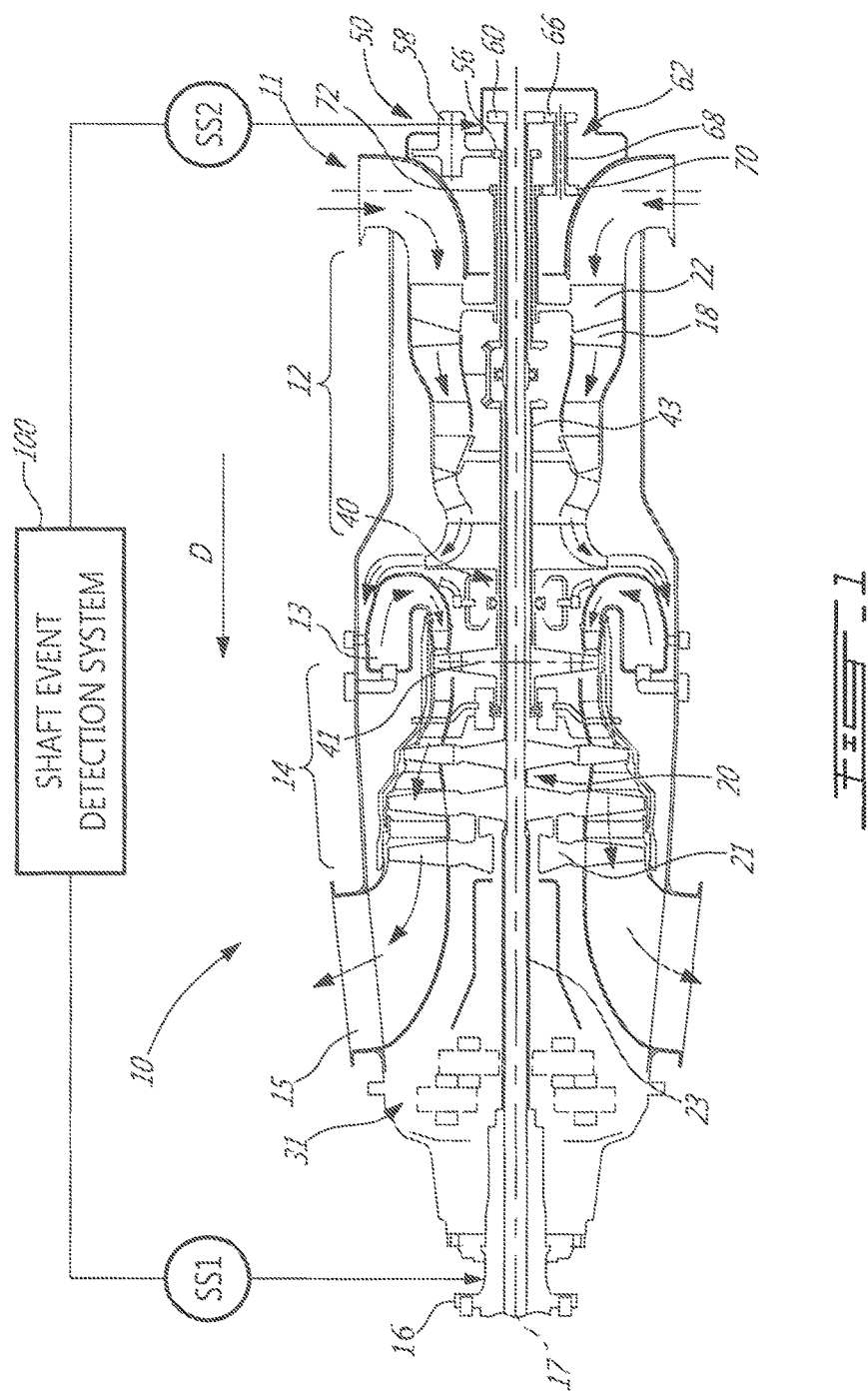

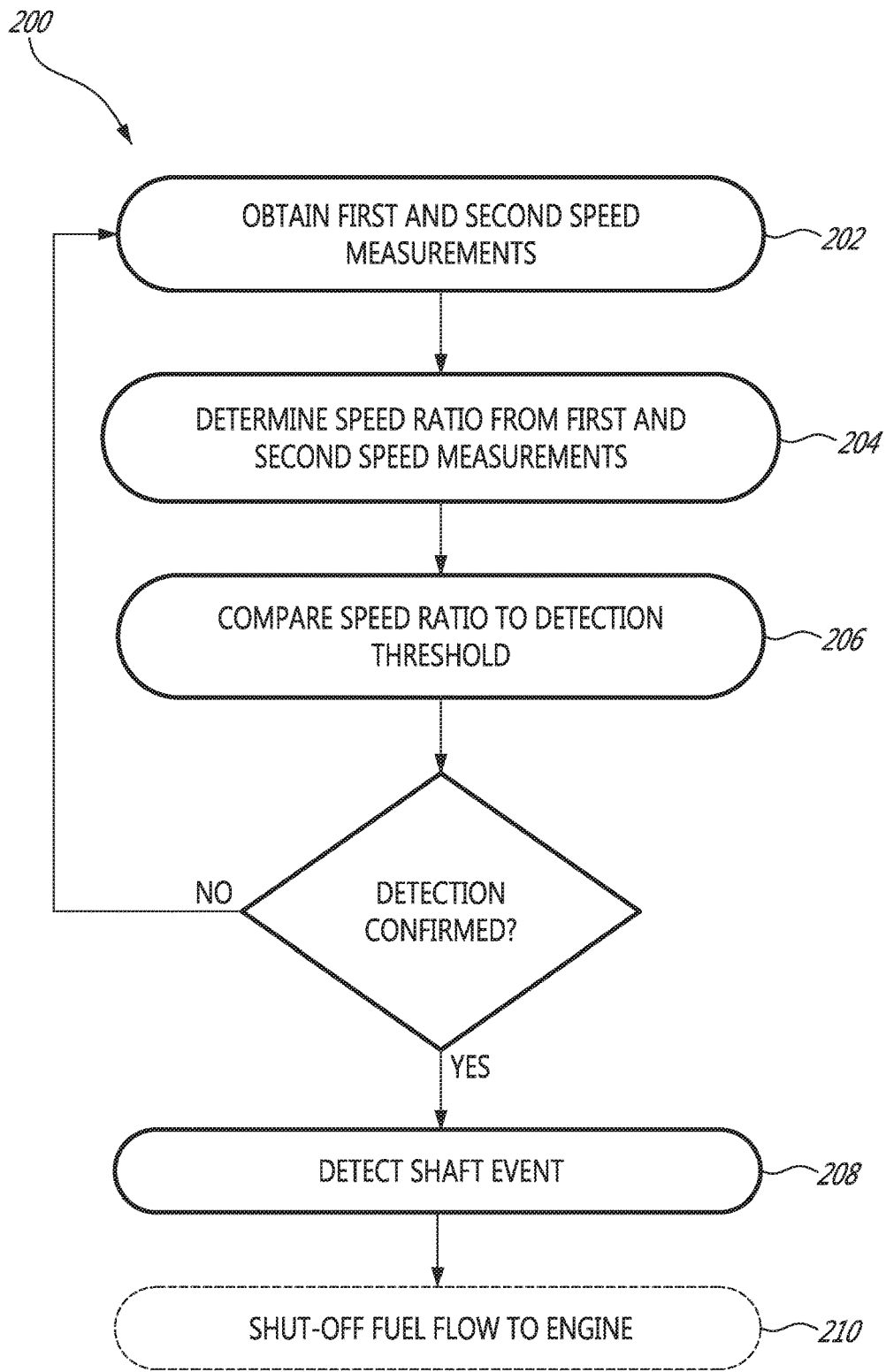

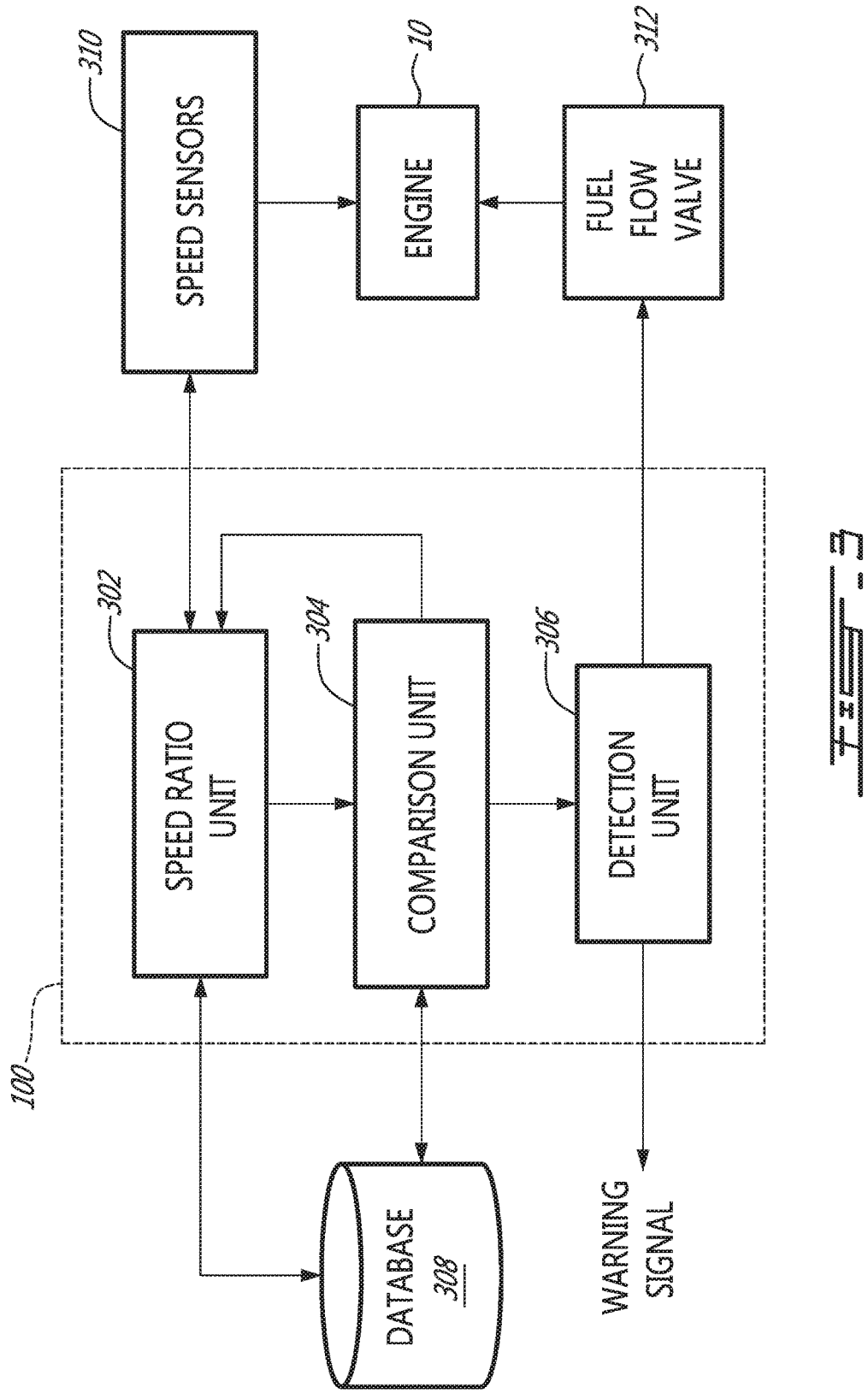

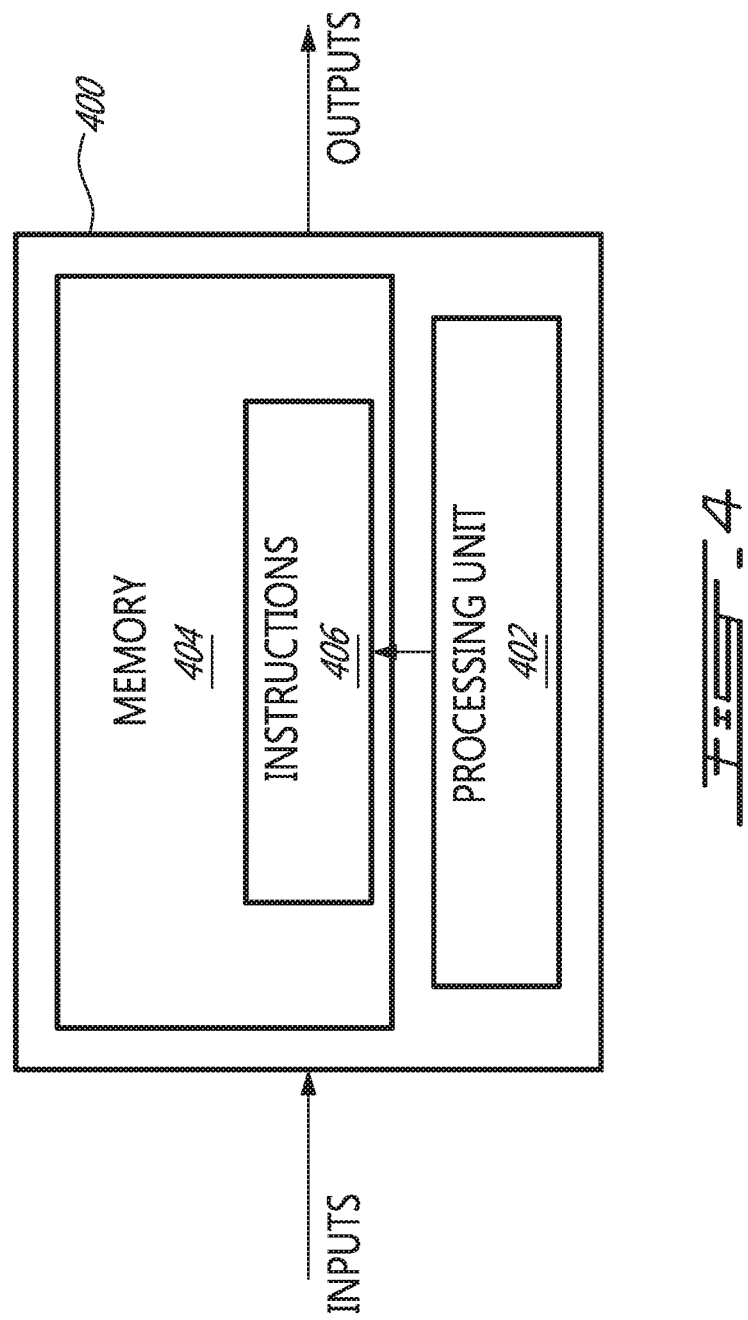

SHAFT EVENT DETECTION IN GAS TURBINE ENGINES

TECHNICAL FIELD

The disclosure relates generally to detecting in gas turbine engines and, more particularly, to detecting shaft events in gas turbine engines.

BACKGROUND OF THE ART

In order to detect a shaft shear or an over-speed condition, a probe is typically provided as close as possible to the power turbine. However, this area is a hot zone where probe failure is more likely. To reduce the risk of failure for the probe, it may be located further away from the power turbine. However, this can make certain sections of the shaft more difficult to accurately monitor, thus making the detection system less reliable.

Therefore, there is a need for improvement in shaft shear and over-speed detection systems.

SUMMARY

There is described herein methods and systems for detecting a shaft event in a gas turbine engine comprising a power turbine having a first shaft extending in a first direction and a second shaft extending in a second direction opposite from the first direction. A first speed measurement is obtained at a first location along the first shaft and a second speed measurement is obtained at a second location along the second shaft. A speed ratio is determined between the first speed measurement and the second speed measurement, and is compared to a detection threshold. The shaft event is detected when the speed ratio is beyond the detection threshold.

In one aspect, there is provided a method for detecting a shaft event in a gas turbine engine of an aircraft. The method comprises obtaining a first speed measurement at a first location along a first shaft extending between a power turbine of the gas turbine engine and a first load and a second speed measurement at a second location along a second shaft extending between the power turbine and a second load; determining a speed ratio between the first speed measurement and the second speed measurement; comparing the speed ratio to a detection threshold; and detecting the shaft event when the speed ratio is beyond the detection threshold.

In another aspect, there is provided a system for detecting a shaft event in a gas turbine engine. The system comprises a processing unit and a non-transitory memory communicatively coupled to the processing unit. The memory comprises computer-readable program instructions executable by the processing unit for obtaining a first speed measurement at a first location along a first shaft extending between a power turbine of the gas turbine engine and a first load and a second speed measurement at a second location along a second shaft extending between the power turbine and a second load; determining a speed ratio between the first speed measurement and the second speed measurement; comparing the speed ratio to a detection threshold; and detecting the shaft event when the speed ratio is beyond the detection threshold.

In yet another aspect, there is provided a gas turbine engine comprising a power turbine having a first shaft extending between the power turbine and a first load and a second shaft extending between the power turbine and a second load; at least one first speed sensor located at a first location along the first shaft; at least one second speed sensor located at a second location along the second shaft; and a shaft shear event detection system operatively coupled to the at least one first speed sensor and the at least one second speed sensor. The shaft shear event detection system is configured for obtaining a first speed measurement at the first location and a second speed measurement at the second location from the at least one first speed sensor and the at least one second speed sensor, respectively; determining a speed ratio between the first speed measurement and the second speed measurement; comparing the speed ratio to a detection threshold; and detecting the shaft event when the speed ratio is beyond the detection threshold.

DESCRIPTION OF THE DRAWINGS

Reference is now made to the accompanying figures in which:

FIG. 1 is a schematic cross-sectional view of a gas turbine engine;

FIG. 2 is a flowchart of a shaft event detection method, in accordance with an embodiment;

FIG. 3 is an example embodiment of a shaft event detection system; and

FIG. 4 is an example computing device for implementing the shaft event detection system of FIG. 3.

DETAILED DESCRIPTION

There is described herein methods and systems for detecting a shaft event, such as a shaft shear, a shaft decoupling, an over-speed, and/or a shaft failure in a gas turbine engine. The methods and systems are applicable to gas turbine engines having two mechanical drives extending from opposite directions of a turbine.

FIG. 1 illustrates an example gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the engine 10. The engine 10 further has a drive output shaft 16 having a front end configured to drive a rotatable load (not shown). The rotatable load can, for instance, take the form of a propeller or a rotor, such as a helicopter main rotor. Depending on the intended use, the engine 10 can be configured as a turboprop engine or a turboshaft engine. FIG. 1 illustrates a turboprop configuration. The gas turbine engine 10 has a centerline or longitudinal center axis 17 about which the compressor and turbine rotors rotate.

The gas turbine engine 10 has an axially extending central core which defines a gas path 18 through which gases flow, as depicted by flow arrows in FIG. 1. The exemplary embodiment shown in FIG. 1 is a "reverse-flow" engine because gases flow through the gas path 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the gas path 18 of the engine 10 disclosed herein can be better appreciated by considering that the gases flow through the gas path 18 in the same direction D as the one along which an aircraft engine travels during flight. Stated differently, in the non-limitative example shown in FIG. 1, gases flow through the engine 10 from a rear end thereof towards the output shaft 16.

It will thus be appreciated that the expressions "forward" and "aft" used herein refer to the relative disposition of components of the engine 10, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to an output shaft 16 (e.g. closer to the propeller in a turboprop application). Similarly, a component of the engine 10 that is "aft" of another component is arranged within the engine 10 such that it is further away from the output shaft 16.

Still referring to FIG. 1, the engine 10 has multiple spools which perform compression to pressurize the air received through the air inlet 11, and which extract energy from the combustion gases before they exit the gas path 18 via the exhaust outlet 15. More particularly, the illustrated embodiment comprises a low pressure (LP) spool 20 and a high pressure (HP) spool 40 mounted for rotation about the engine axis 17. The LP and HP spools 20, 40 are independently rotatable about the axis 17.

The LP spool 20 includes at least one component to compress the air that is part of the compressor section 12, and at least one component to extract energy from the combustion gases that is part of the turbine section 14. More particularly, the LP spool 20 has an LP turbine 21, also known as a power turbine, which may include different number of stages (three stages in the illustrated embodiment), and which drives an LP compressor 22 (also referred to as a boost). The LP turbine 21 drives the LP compressor 22, thereby causing the LP compressor 22 to pressurize incoming air from the air inlet 11. The LP compressor 22 is disposed just forward of the air inlet 11. Both the LP turbine 21 and the LP compressor 22 are disposed along the center axis 17. In the depicted embodiment, both the LP turbine 21 and the LP compressor 22 include rotatable components having an axis of rotation that is coaxial with the center axis 17. It is understood that they may include one or more stages depending upon the desired engine thermodynamic cycle.

The LP turbine 21 is forward of the LP compressor 22. The LP turbine 21 is also aft of the exhaust outlet 15. The LP compressor 22 is forward of the air inlet 11. This arrangement of the LP turbine 21 and the LP compressor 22 provides for a reverse-flow engine 10 that has one or more LP compressor stages located at the rear of the engine 10, and which are driven by one or more low pressure turbine stages located at the front of the engine 10.

The LP spool 20 further comprises an LP shaft 23 coaxial with engine axis 17. The LP turbine 21 is drivingly connected to the LP shaft 23. The LP shaft 23 allows the LP turbine 21 to drive the LP compressor 22 during operation of the engine 10. The LP shaft 23 is drivingly coupled to the LP compressor 22 via a gear train, thereby allowing the LP compressor 22 to run at a different rotational speed from the LP turbine 21.

The LP shaft 23 with the portions thereof extending forward and aft of the LP turbine 21 provides the engine 10 with bidirectional drive. Modularity criteria for gas turbine engines may motivate the use of distinct shaft sections in opposed axial directions from the LP turbine 21. The LP shaft sections may be directly or indirectly connected together. Alternately, as shown in FIG. 1, the LP shaft 23 can be integral with a first portion of the LP shaft extending axially rearwardly from the LP turbine 21, and a second portion (a power turbine segment) extending between a Reduction Gear Box (RGB) 31 and the LP turbine 21 forwardly from the LP turbine 21. Whether the LP shaft 23 is integral or segmented, the LP turbine 21 provides rotational drive outputted at each end of the LP shaft 23.

According to the non-limiting embodiment illustrated in FIG. 1, the LP shaft 23 is a one piece shaft and extends axially through a central bore of the LP compressor 22 to a location aft of the LP compressor 22 for connection with an axially mounted boost gear train disposed on an aft facing side of the LP compressor 22. The use of such a one piece LP shaft 23 may allow the shaft to be introduced in the engine at the end of the assembly process in a single operation, thereby simplifying the assembly procedure.

However, it is understood that the LP shaft 23 is not limited to the configuration depicted in FIG. 1. As mentioned above, instead of being provided in the form of a one piece through shaft, it could be divided into serially interconnectable sections. Other suitable connections could be provided between adjacent LP shaft sections to transfer torque from the LP turbine 21. In addition, while illustrated as having an LP turbine 21 with two shafts extending in opposite directions, the shafts may also be extending in a same direction, or in different directions that are not opposite, such as at a right angle. For example, one shaft may extend along a transversal axis relative to the engine axis 17.

In the embodiment of FIG. 1, the rotatable load, when mounted to the engine 10, and the LP compressor 22 are disposed on opposite ends of the LP turbine 21. It can thus be appreciated that one or more low pressure turbine stages are used to drive elements in front of the LP turbine (e.g. propeller, RGB 31, etc.) as well as to drive elements to the rear of the LP turbine (e.g. LP compressor 22). This configuration of the LP turbine 21 allows it to simultaneously drive the rotatable load and the LP compressor 22. The portion of LP shaft 23 forward to the LP turbine 21 is referred to herein as the forward portion of the LP shaft. The portion of LP shaft 23 aft of the LP turbine 21 is referred to herein as the aft portion of the LP shaft 23.

At least one first speed sensor, such as SS1, is located at a first location along the forward portion of the LP shaft 23. At least one second speed sensor, such as SS2, is located at a second location along the aft portion of the LP shaft 23. Any type of speed sensor may be used, and may be contact-based or non-contact based, such as a tachometer, a speed probe, a Hall effect sensor, an optical sensor, a magnetic sensor, a proximity sensor, an inductive sensor, and the like. More than one speed sensor may be provided at each location, for redundancy purposes and/or for obtaining multiple measurements that are averaged into a single measurement.

The first speed sensor SS1 may be positioned anywhere along the forward portion of the LP shaft 23. In the embodiment illustrated in FIG. 1, the first speed sensor SS1 is located at a flange of the drive output shaft 16, but it may also be located, for example, at another position along the drive output shaft 16, in an area around the RGB 31, or aft of the RGB 31 up until a forward portion of the LP turbine 21.

The second speed sensor SS2 may be positioned anywhere along the aft portion of the LP shaft 23. The LP shaft 23 projects all the way to the aft end of the engine 10 into an Accessory Gear Box (AGB) 50 axially for connection with a gear train 62. The gear train 62 comprises an input gear 60 provided at the distal end portion of the LP shaft 23, the end portion which projects outwardly of a high pressure (HP) shaft 43. The input gear 60 is in meshing engagement with a second gear 66 mounted at an aft end of a transfer shaft 68 having a rotation axis parallel to the engine axis 17. A third gear 70 is provided for meshing engagement with a fourth gear 72. In the embodiment illustrated in FIG. 1, the second speed sensor SS2 is located in an area of the AGB 50, between AGB gears 56, 58. Alternatively, the second speed sensor SS2 may be positioned between gears 56 and 60, between gears 56 and 72, or forward of gear 72, up until an aft portion of the LP turbine 21.

In light of the preceding, it can be appreciated that the LP turbine 21 has two mechanical drives that each extend between the LP turbine 21 and a respective load. In order to detect a shaft event, a speed measurement for each of the loads is located such that the loss of drive to one of the loads can be seen as a change of load speed by its assigned speed sensor while the other load sensor continues to read a different speed for the load that remains mechanically driven by the turbine. The speed sensors, such as SS1 and SS2, are operatively connected to a shaft event detection system 100, which is configured to perform a method for detecting a shaft event. An example embodiment of the method 200 is illustrated in FIG. 2.

At step 202, first and second speed measurements are obtained. The first speed measurement is obtained at a first location along a first shaft extending from a power turbine of a gas engine, such as the forward portion of the LP shaft 23 extending from the LP turbine 21 of engine 10. The second speed measurement is obtained at a second location along a second shaft extending from the power turbine of the gas engine, such as the aft portion of the LP shaft 23 extending from the LP turbine 21 of engine 10, the second shaft extending from the power turbine in a direction opposite to the first shaft.

At step 204, a speed ratio is determined from the first speed measurement and the second speed measurement. For example, if SS1 measures 1400 rotations per minute (RPM) and SS2 measures 28000 RPM, the speed ratio of 20 (28000/1400) or 0.05 (1400/28000) is obtained.

At step 206, the speed ratio is compared to a detection threshold. If the speed ratio is beyond the detection threshold, a shaft event is detected, as per step 208. If the speed ratio is not beyond the detection threshold, the method 200 returns to step 202 to obtain new speed measurements, followed by step 204 of determining a new speed ratio, and followed by step 206 of comparing the new speed ratio to the detection threshold.

In some embodiments, the method 200 is performed continuously, with speed measurements obtained from the first speed sensor location and the second speed sensor location at regular intervals and each new pair of speed measurements sent to the shaft event detection system 100 for processing. The intervals may be as short as physically possible for the sensors to acquire the measurements and for the shaft event detection system 100 to process the measurements. Alternatively, the intervals may be spaced according to a desired timing, such as every 10 ms, 1 s, 10 s, etc.

The detection threshold may correspond to a given number, such as 25, 30, or 35, to which the speed ratio is compared. The detection threshold may be an upper threshold or a lower threshold, whereby a shaft event is detected when the speed ratio is above the upper threshold or below the lower threshold, respectively. In some embodiments, the detection threshold is a range, such as 20 to 30, and a shaft event is detected when the speed ratio is outside of the range.

In some embodiments, the detection threshold corresponds to an allowed variation from a given value. The given value may correspond to a nominal speed ratio for a given mode of operation of the engine or flight phase of the aircraft, such as 20 for a flight phase of "cruise" or 35 for a flight phase of "ascent". The given value may also correspond to one or more previous speed ratio values obtained from the engine during a given operation period. For example, the speed ratio obtained at time $t_n$ may be compared to the speed ratio obtained at time $t_{n-1}$. Alternatively, the speed ratio obtained at time $t_n$ may be compared to an average or mean value of speed ratios obtained from times $t_{n-x}$ to $t_{n-1}$. Also alternatively, the speed ratio obtained at time $t_n$ may be compared to the speed ratio obtained at time $t_{n-x}$, where x is greater than 1. The allowed variation may correspond to a percentage, such as 5%, 10%, or 25%, or to a number, such as 5, 7, 12. Other percentages and numbers are also considered.

In some embodiments, the detection threshold varies as a function of the mode of operation of the engine and/or the flight phase of the aircraft. For example, a first detection threshold is used during a start-up mode, a second detection threshold is used during an idle mode, and a third detection threshold is used during an acceleration mode. In another example, a first detection threshold is used during a take-off flight phase, a second detection threshold is used during a cruise flight-phase, and a third detection threshold is used during a descent flight phase. Various combinations of engine operation modes and flight phases may also be used to determine a given detection threshold. The method 200 may thus comprise a step of determining a detection threshold as a function of one or more of a flight phase, an engine operation mode, and a user setting.

In some embodiments, a shaft event is detected only after a predetermined number of iterations where the speed ratio moves beyond the detection threshold. For example, the number of required iterations may be set to 2, 5, 10, or any other value used to satisfy a criteria for confirming the measurement. In such embodiments, a counter may be set to an initial value and incremented until the counter value is equal to or greater than the number of required iterations. This may be done, for example, when confirming detection after having compared the speed ratio to the detection threshold, as per step 206.

In some embodiments, step 208 of detecting the shaft event comprises transmitting a signal indicative of the shaft event. The signal may be used to shut-off the fuel flow to the engine, as per step 210. Alternatively, or in combination therewith, detecting the shaft event comprises triggering a warning, such as a light or a text message in an aircraft cockpit or elsewhere, indicative of the shaft event. Other embodiments for actions resulting from the detected shaft event may also be used.

FIG. 3 illustrates an exemplary embodiment of the shaft event detection system 100. The system 100 illustratively comprises a speed ratio unit 302, a comparison unit 304, and a detection unit 306. The speed ratio unit 302 is configured to obtain the speed measurements, by receiving the measurements or retrieving the measurements from a local or remote storage medium, such as database 308. In some embodiments, the speed ratio unit 302 is operatively coupled to the speed sensors 310 and receives measurements directly therefrom. In some embodiments, the speed ratio unit 302 is configured for controlling the speed sensors 310 so as to cause the measurements to be acquired. Various data processing operations may be performed on the received measurements by the speed ratio unit 302, such as averaging, filtering, fault detection, and the like. Previous speed measurements may be stored in database 308 for future use. The speed ratio unit 302 is configured for determining the speed ratio from the first speed measurement and the second speed measurement, obtained from the first location and the second location, as described above.

The speed ratio is provided to the comparison unit 304 and compared to the detection threshold. The detection threshold may be retrieved or received from a local or remote storage medium, such as database 308. In some embodiments, the comparison unit 304 or the speed ratio unit 302 may be configured to receive various parameters and to generate the detection threshold for comparison with the speed ratio. The speed ratio unit 302 or the comparison unit 304 may be configured to retrieve engine specific parameters, for example from database 308, in order to generate the detection threshold using detection threshold specifications. In some embodiments, the detection threshold is determined dynamically in flight and changes as the engine and/or aircraft parameters change. The result of the comparison is transmitted to the detection unit 306, which may be configured to transmit a fuel shutoff command to one or more engine fuel flow valve 312. The detection unit 306 may also be configured to transmit a warning signal, for example to the aircraft cockpit or externally to the aircraft, in case of a shaft event.

In some embodiment, there may be a feedback loop between the comparison unit 304 the speed ratio unit 302 in order to increment a counter, and the shaft event is only detected when the counter reaches a predetermined number.

The detection system 100 may be implemented in various manners, such as in software on a processor, on a programmable chip, on an Application Specific Integrated Chip (ASIC), or as a hardware circuit. In some embodiments, the detection system 100 is implemented in hardware on a dedicated circuit board located inside an Electronic Engine Controller (EEC) or an Engine Control Unit (ECU). The EEC or ECU may be provided as part of a Full Authority Digital Engine Control (FADEC) of an aircraft. In some cases, a processor may be used to communicate information to the circuit, such as speed measurements and/or detection thresholds. In other embodiments, the detection system 100 is implemented in a digital processor. In some embodiments, the FADEC performs the shutdown of the fuel once a shaft shear event has been detected.

An example embodiment of the system 100 is illustrated in FIG. 4. A computing device 400 may comprise, amongst other things, a processing unit 402 and a memory 404 which has stored therein computer-executable instructions 406. The processing unit 402 may comprise any suitable devices configured to cause a series of steps to be performed so as to implement the method 200 such that instructions 406, when executed by the computing device 400 or other programmable apparatus, may cause the functions/acts/steps specified in the methods described herein to be executed. The processing unit 402 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 404 may comprise any suitable machine-readable storage medium. The memory 404 may comprise non-transitory computer readable storage medium such as, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device 400, such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may comprise any storage means (e.g., devices) suitable for retrievably storing machine-readable instructions executable by processing unit.

In some embodiments, the computing device 400 sends one or more control signals directly to fuel valves for shutting off the engine fuel flow. In other embodiments, the control signals are sent to an intermediary unit (not shown), which translates the control signals sent by the computing device 400 into signals to be sent to the fuel valves.

The methods and systems for detecting the shaft event described herein may be implemented in a high level procedural or object oriented programming or scripting language, or a combination thereof, to communicate with or assist in the operation of a computer system, for example the computing device 400. Alternatively, the methods and systems for detecting the shaft event may be implemented in assembly or machine language. The language may be a compiled or interpreted language. Program code for implementing the methods and systems for detecting the shaft event may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting the shaft event may also be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and systems for detecting the shaft event may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for detecting a shaft event in a gas turbine engine of an aircraft, the method comprising:
obtaining a first speed measurement at a first location along a first shaft extending between a power turbine of the gas turbine engine and a first load and a second speed measurement at a second location along a second shaft extending between the power turbine and a second load;
determining a speed ratio between the first speed measurement and the second speed measurement;
comparing the speed ratio to a detection threshold;
detecting the shaft event when the speed ratio is beyond the detection threshold; and
issuing a signal indicative of the shaft event in response to detecting the shaft event.

2. The method of claim 1, wherein the detection threshold comprises a maximum allowed variation between the speed ratio and at least one previously obtained speed ratio of the gas turbine engine.

3. The method of claim 2, wherein the at least one previously obtained speed ratio is obtained immediately prior to the first speed measurement and the second speed measurement.

4. The method of claim 1, further comprising determining the detection threshold as a function of at least one of a mode of operation of the engine and a flight phase of the aircraft.

5. The method of claim 4, wherein the detection threshold changes dynamically as a function of changes to the at least one of a mode of operation of the engine and a flight phase of the aircraft.

6. The method of claim 1, wherein the first location is at a first end of the first shaft and the second location is at a second end of the second shaft.

7. The method of claim 1, wherein the gas turbine engine is a reverse flow split compressor engine.

8. The method of claim 7, wherein the first shaft and the second shaft form an integral one-piece shaft.

9. The method of claim 1, wherein the first shaft extends in a first direction and the second shaft extends in a second direction opposite from the first direction.

10. A system for detecting a shaft event in a gas turbine engine, the system comprising:
a processing unit; and
a non-transitory memory communicatively coupled to the processing unit and comprising computer-readable program instructions executable by the processing unit for:
obtaining a first speed measurement at a first location along a first shaft extending between a power turbine of the gas turbine engine and a first load and a second speed measurement at a second location along a second shaft extending between the power turbine and a second load;
determining a speed ratio between the first speed measurement and the second speed measurement;
comparing the speed ratio to a detection threshold;
detecting the shaft event when the speed ratio is beyond the detection threshold; and
issuing a signal indicative of the shaft event in response to detecting the shaft event.

11. The system of claim 10, wherein the detection threshold comprises a maximum allowed variation between the speed ratio and at least one previously obtained speed ratio of the gas turbine engine.

12. The system of claim 11, wherein the at least one previously obtained speed ratio is obtained immediately prior to the first speed measurement and the second speed measurement.

13. The system of claim 10, further comprising determining the detection threshold as a function of at least one of a mode of operation of the engine and a flight phase of the aircraft.

14. The system of claim 13, wherein the detection threshold changes dynamically as a function of changes to the at least one of a mode of operation of the engine and a flight phase of the aircraft.

15. The system of claim 10, wherein the first location is at a first end of the first shaft and the second location is at a second end of the second shaft.

16. The system of claim 10, wherein the gas turbine engine is a reverse flow split compressor engine.

17. The system of claim 16, wherein the first shaft and the second shaft form an integral one-piece shaft.

18. The system of claim 10, wherein the first shaft extends in a first direction and the second shaft extends in a second direction opposite from the first direction.

19. A gas turbine engine comprising:
a power turbine having a first shaft extending between the power turbine and a first load and a second shaft extending between the power turbine and a second load;
at least one first speed sensor located at a first location along the first shaft;
at least one second speed sensor located at a second location along the second shaft; and
a shaft shear event detection system operatively coupled to the at least one first speed sensor and the at least one second speed sensor and configured for:
obtaining a first speed measurement at the first location and a second speed measurement at the second location from the at least one first speed sensor and the at least one second speed sensor, respectively;
determining a speed ratio between the first speed measurement and the second speed measurement;
comparing the speed ratio to a detection threshold; and
detecting the shaft event when the speed ratio is beyond the detection threshold.

20. The gas turbine engine of claim 19, wherein the first location is at a first end of the first shaft and the second location is at a second end of the second shaft.

* * * * *